United States Patent
Sakimoto et al.

(10) Patent No.: US 11,329,349 B2
(45) Date of Patent: May 10, 2022

(54) POLYOLEFIN MICRO POROUS FILM, SEPARATOR FILM FOR POWER-STORAGE DEVICE, AND POWER-STORAGE DEVICE

(71) Applicant: UBE INDUSTRIES, LTD., Ube (JP)

(72) Inventors: Ryo Sakimoto, Sodegaura (JP); Kenji Kawabata, Osaka (JP); Hiroki Nagumo, Osaka (JP); Taiga Adachi, Osaka (JP)

(73) Assignee: Ube Industries, Ltd., Ube (JP)

( * ) Notice: Subject to any disclaimer, the term of this patent is extended or adjusted under 35 U.S.C. 154(b) by 31 days.

(21) Appl. No.: 15/735,057

(22) PCT Filed: Jun. 17, 2016

(86) PCT No.: PCT/JP2016/068113
§ 371 (c)(1),
(2) Date: Dec. 8, 2017

(87) PCT Pub. No.: WO2016/204274
PCT Pub. Date: Dec. 22, 2016

(65) Prior Publication Data
US 2018/0175353 A1   Jun. 21, 2018

(30) Foreign Application Priority Data

Jun. 19, 2015   (JP) .............................. JP2015-124275
Jul. 29, 2015   (JP) .............................. JP2015-149472
Jun. 10, 2016   (JP) .............................. JP2016-116686

(51) Int. Cl.
*H01M 50/44*   (2021.01)
*B32B 5/32*   (2006.01)
(Continued)

(52) U.S. Cl.
CPC ............... *H01M 50/44* (2021.01); *B32B 5/32* (2013.01); *B32B 27/08* (2013.01); *B32B 27/32* (2013.01);
(Continued)

(58) Field of Classification Search
CPC ....... H01M 10/0525; H01M 2004/027; H01M 2/1626; H01M 50/411; H01M 50/4295;
(Continued)

(56) References Cited

U.S. PATENT DOCUMENTS

2009/0098465 A1   4/2009   Kikuchi et al.
2009/0246614 A1*  10/2009  Kim .................... H01M 2/1653
                                                            429/145
(Continued)

FOREIGN PATENT DOCUMENTS

CN    101616968 A    12/2009
CN    103407140 A    11/2013
(Continued)

OTHER PUBLICATIONS

Machine translation of CN-103465476-A, Tu et al. (Year: 2013).*
(Continued)

*Primary Examiner* — Mayla Gonzalez Ramos
(74) *Attorney, Agent, or Firm* — Knobbe Martens Olson & Bear LLP

(57) ABSTRACT

A polyolefin micro porous film includes at least one of polyethylene and polypropylene, in which the compressive elastic modulus is 95 MPa or more and 150 MPa or less, the surface roughness (Ra) of a film surface is measured for a front surface and a rear surface, and the average value (Ra(ave)) thereof is 0.01 μm to 0.30 μm.

7 Claims, 1 Drawing Sheet

(51) Int. Cl.
  *B32B 27/32* (2006.01)
  *B32B 27/08* (2006.01)
  *H01M 50/411* (2021.01)
  *H01M 10/0525* (2010.01)
  *H01M 50/449* (2021.01)
  *C08J 5/18* (2006.01)
  *H01M 50/429* (2021.01)
  *H01M 4/02* (2006.01)

(52) U.S. Cl.
  CPC ............. *C08J 5/18* (2013.01); *H01M 50/411* (2021.01); *H01M 50/4295* (2021.01); *H01M 50/449* (2021.01); *B32B 2250/03* (2013.01); *B32B 2250/242* (2013.01); *B32B 2250/40* (2013.01); *B32B 2255/10* (2013.01); *B32B 2255/26* (2013.01); *B32B 2307/30* (2013.01); *B32B 2307/306* (2013.01); *B32B 2307/50* (2013.01); *B32B 2307/538* (2013.01); *B32B 2307/734* (2013.01); *B32B 2457/10* (2013.01); *B32B 2457/16* (2013.01); *B32B 2605/00* (2013.01); *C08J 2323/06* (2013.01); *C08J 2323/12* (2013.01); *H01M 10/0525* (2013.01); *H01M 2004/027* (2013.01); *Y02E 60/13* (2013.01)

(58) Field of Classification Search
  CPC ..... H01M 50/44; H01M 50/449; B32B 27/32; B32B 5/32; B32B 27/08; B32B 2457/10; B32B 2457/16; B32B 2307/30; B32B 2307/306; B32B 2307/50; B32B 2307/538; B32B 2307/734; B32B 2250/03; B32B 2250/242; B32B 2250/40; B32B 2255/10; B32B 2255/26; B32B 2605/00; C08J 5/18; C08J 2323/06; C08J 2323/12; Y02E 60/13
  See application file for complete search history.

(56) References Cited

U.S. PATENT DOCUMENTS

| | | | |
|---|---|---|---|
| 2011/0143183 A1* | 6/2011 | Matsumoto | H01M 2/1626 429/144 |
| 2015/0093627 A1 | 4/2015 | Busch et al. | |
| 2015/0236322 A1* | 8/2015 | Laramie | H01M 10/052 429/145 |
| 2017/0033403 A1* | 2/2017 | Kim | H01M 10/0567 |

FOREIGN PATENT DOCUMENTS

| | | | |
|---|---|---|---|
| CN | 103465476 A | * | 12/2013 |
| JP | B-55-032531 | | 8/1980 |
| JP | A-55-131028 | | 10/1980 |
| JP | H 07304110 A | | 11/1995 |
| JP | 2005171230 A | * | 6/2005 |
| JP | A-2007-087690 | | 4/2007 |
| JP | B-4209985 | | 1/2009 |
| JP | A-2010-247446 | | 11/2010 |
| JP | A-2011-028883 | | 2/2011 |
| JP | A-2011-154936 | | 8/2011 |
| JP | A-2012-038530 | | 2/2012 |
| JP | A-2012-038655 | | 2/2012 |
| JP | A-2012-161936 | | 8/2012 |
| JP | B-5031791 | | 9/2012 |
| JP | A-2013-023673 | | 2/2013 |
| JP | B-5259721 | | 8/2013 |
| JP | B-5459139 | | 4/2014 |
| JP | A-2014-141644 | | 8/2014 |
| KR | 10-2009-0103011 | | 10/2009 |
| KR | 10-2010-0053685 | | 5/2010 |
| WO | WO 2009/048172 A1 | | 4/2009 |

OTHER PUBLICATIONS

Machine translation of JP-2005171230-A, Tanaka et al. (Year: 2005).*
Search Report in International Application No. PCT/JP2016/068113, dated Sep. 20, 2016.
Office Action in Japanese Patent Application No. 2015-149472, dated Dec. 8, 2015.
Search Report issued in corresponding European Patent Application No. 16811748.9, dated Jan. 29, 2019.
Office Action in Chinese Patent Application No. 2016800353941 dated Apr. 2, 2020.

* cited by examiner

POLYOLEFIN MICRO POROUS FILM, SEPARATOR FILM FOR POWER-STORAGE DEVICE, AND POWER-STORAGE DEVICE

RELATED APPLICATIONS

This application is the U.S. National Phase under 35 U.S.C. § 371 of International Application PCT/JP2016/068113, filed Jun. 17, 2016, designating the U.S., and published in Japanese as WO 2016/204274 on Dec. 22, 2016, which claims priority to Japanese Patent Application No. 2015-124275, filed Jun. 19, 2015; to Japanese Patent Application No. 2015-149472, filed Jul. 29, 2015; and Japanese Patent Application No. 2016-116686, filed Jun. 10, 2016, the entire contents of which are incorporated herein by reference.

TECHNICAL FIELD

The present invention relates to a polyolefin micro porous film used as a separator film for a power-storage device, and relates to a polyolefin micro porous film having excellent pressure resistance in a thickness direction.

Priority is claimed on Japanese Patent Application No. 2015-124275, filed on Jun. 19, 2015, Japanese Patent Application No. 2015-149472, filed on Jul. 29, 2015, and Japanese Patent Application No. 2016-116686, filed on Jun. 10, 2016, the contents of which are incorporated herein by reference.

BACKGROUND ART

In a power-storage device such as a lithium-ion secondary battery or a lithium-ion capacitor, a separator film made of a polyolefin micro porous film is interposed in order to prevent a short circuit between positive and negative electrodes. In recent years, as a power-storage device with high energy density, high electromotive force, and low self-discharge, particularly a lithium-ion secondary battery, a lithium-ion capacitor, and the like have been developed and put to practical use.

As the negative electrode of a lithium-ion secondary battery, for example, metal lithium, an alloy of lithium and another metal, an organic material having an ability to adsorb lithium ions or an ability to occlude lithium ions through intercalation, such as carbon or graphite, a conductive polymer material doped with lithium ions, and the like have been known. In addition, as the positive electrode, for example, graphite fluoride represented by $(CF_x)_n$, metal oxide such as $MnO_2$, $V_2O_5$, $CuO$, $Ag_2CrO_4$, or $TiO_2$, sulfide, and chloride have been known.

As a nonaqueous electrolytic solution, a solution obtained by dissolving an electrolyte such as $LiPF_6$, $LiBF_4$, $LiClO_4$, or $LiCF_3SO_3$ in an organic solvent such as ethylene carbonate (EC), propylene carbonate (PC), diethyl carbonate (DEC), dimethyl carbonate (DMC), γ-butyrolactone, acetonitrile, 1,2-dimethoxyethane, or tetrahydrofuran has been used.

However, lithium has particularly strong reactivity, and in a case where an abnormal current flows due to an external short circuit, an erroneous connection, or the like, the battery temperature may significantly rise. In this case, there is concern that thermal damage to a device with a battery assembled therein may be caused. In order to avoid such a risk, it has been suggested to use a single-layer or laminated polyolefin micro porous film as a separator film for a power-storage device such as a lithium-ion secondary battery or a lithium-ion capacitor.

When such a single-layer or laminated polyolefin micro porous film is used as a separator of a power-storage device, prevention of a short circuit between both electrodes, maintenance of a voltage of a device, and the like can be achieved, and a danger of ignition or the like due to an excessive temperature rise can be prevented, thereby securing safety. In the single-layer or laminated polyolefin micro porous film, when the internal temperature of the device rises to a predetermined temperature or higher due to an abnormal current or the like, pores of the porous film are blocked and become closed to increase electrical resistance so as not to allow ions to flow between both electrodes. Accordingly, the function of allowing ions to flow is stopped. The function of preventing a danger of ignition or the like due to an excessive temperature rise is extremely important for a separator film for a power-storage device and is generally called pore closing or shutdown (hereinafter, referred to as SD).

In a case where the polyolefin micro porous film is used as the separator film for a power-storage device, when a pore closing starting temperature is too low, the flow of ions is impeded by a slight temperature rise in the power-storage device, which results in a problem in practical use. Contrary to this, when the pore closing starting temperature is too high, there is a risk that the flow of ions will not be impeded until ignition or the like occurs, which results in a safety problem. In general, the pore closing starting temperature is considered to be 110° C. to 160° C., and preferably 120° C. to 150° C.

In addition, in a case where the temperature in the power-storage device rises above a pore closing maintenance upper limit temperature, the separator film may be melted and broken. In this case, the movement of ions is resumed due to the breakage, and the temperature further rises. For this reason, the polyolefin micro porous film used in the separator film is required to have characteristics in which a suitable pore closing starting temperature for a separator for a power-storage device is provided, the upper limit temperature at which pore closing is maintained, and the temperature range in which pore closing can be maintained is wide. Furthermore, the polyolefin micro porous film used in the separator film is also required to have, in addition to the characteristics regarding pore closing, low electrical resistance, high mechanical strength such as tensile strength, low variation in thickness unevenness, electrical resistance, and the like.

As a method of producing a single-layer or laminated porous film used in a separator film for a power-storage device, various suggestions have been made. In particular, a method of forming pores can be roughly classified into a wet method and a dry method (see Patent Documents 1 and 2).

For example. Patent Document 1 discloses a wet method of producing a micro porous film through stretching. Specifically, a film is formed by a resin in which a resin such as polyethylene (PE) or polypropylene (PP) as a matrix resin for forming a micro porous film and additives are added and mixed. In addition, the film is formed into a sheet, and the additives are extracted from the film formed of the matrix resin and the additives. Accordingly, pores are formed in the matrix resin, and a micro porous film is produced by stretching the matrix resin. As the additives, a solvent miscible with the resin, a plasticizer, inorganic fine particles, and the like has been proposed.

In a case of using the wet method as the method of producing a micro porous film, the viscosity of the resin during extrusion can be reduced by adding additives such as a solvent. Therefore, it is possible to produce a film using a raw material with a high molecular weight as a polymer which is a multi-layer film raw material, and the improvement in mechanical properties such as puncture strength or breaking strength is facilitated. However, time and efforts are necessary for a process of extracting the solvent, and thus it is difficult to improve productivity.

In addition, the pore diameter of the micro porous film obtained in the wet method is relatively large, and the air permeability (Gurley value) tends to be lower than the porosity. Such a micro porous film has a problem that dendrites are relatively easily generated when charging or discharging is performed at a high rate as in automobile applications. In addition, in a case of an attempt to improve the SD characteristics, there are also problems such as the deterioration in meltdown characteristics or difficulty in adjustment.

As the dry method, for example, as described in Patent Document 2, a method of forming pores using cleavage at the time of stretching is proposed. Specifically, by adopting a setting with a high draft ratio at the time of melt extrusion, the lamellar structure in a film formed into a sheet before stretching is controlled. By uniaxially stretching the film, cleavage is caused at the interface between lamellae such that pores are formed.

In a case of adopting the dry method as the method of producing a micro porous film, the process of extracting a solvent, which is essential in the wet method, is not needed. Therefore, superior productivity to that in the wet method is achieved. However, the stretching rate is limited, and it is difficult to further improve the productivity.

The pore diameter of the porous film obtained in the dry method is smaller than that in the wet method, and the Gurley value tends to be higher than the porosity. Therefore, for example, it is considered that even in a case where charging or discharging is performed at a high rate as in a power-storage device for automobile applications, generation of dendrites and the like can be effectively suppressed.

However, in order to improve the safety of a battery, the separator is required to have heat resistance. In particular, it has been known that heat resistance is improved by forming a heat-resistant coating layer by coating a separator film with inorganic particles (Patent Document 7).

In recent years, a power-storage device for automotive applications has been put to practical use and has been increased in capacity and rate. As the power-storage device repeats charging and discharging, expansion and contraction of the positive and negative electrode active materials are repeated inside the device. It has been generally known that when a plurality of devices or power-storage devices are stacked into a module in order to prevent the module itself from expanding and contracting during charging and discharging, the power-storage devices are accommodated in a case for the module while a pressure is applied to the power-storage devices by a restraint member (see Patent Document 3).

For example, in a lithium-ion secondary battery as a power-storage device for automotive applications, it has been known that a method in which a flat wound body is crushed in the thickness direction and is accommodated in a can, or a laminated cell is used. In such a power-storage device, a constant pressure is continuously applied in a lamination direction of a separator film by a restraint member from the outside in a use environment. Furthermore, in the device, pressure due to expansion and contraction is applied in the lamination direction of the separator film whenever charging or discharging is performed.

On the other hand, in order to achieve a high capacity for the device, the density of the positive and negative electrode active materials included in the device has been increased, so that the proportion of the active materials in the device is increased and the proportion of the nonaqueous electrolytic solution is decreased. Whenever the device is charged or discharged, a behavior in which the separator film returns to its original thickness after being compressed is repeated, and release and reintroduction of the nonaqueous electrolytic solution from and into the pores in the separator are repeated. Therefore, when the proportion of the nonaqueous electrolytic solution in the space in the device decreases, there is a possibility that a situation in which the released nonaqueous electrolytic solution cannot be sufficiently returned into the pores of the separator may occur.

Furthermore, since the vicinity of the surface of the separator, which is susceptible to a pressure from the positive and negative electrode active materials, is strongly compressed, the distribution of the nonaqueous electrolytic solution tends to become nonuniform near the surface of the separator, and the positive and negative electrode active materials in contact with the portions of the separator where the nonaqueous electrolytic solution is insufficient cannot sufficiently contribute to charging and discharging. As a result, the deterioration of the characteristics of the charging device caused by the resistance in the lamination direction of the separator film, such as the nonuniform charged state in the electrodes and the deterioration of the positive and negative electrode active materials, has been pointed out (see Patent Document 4).

In order to solve the problems described above, as described in Patent Document 5, a separator film which flexibly follows an external force in a lamination direction of the separator film like a sponge has been proposed.

However, the flexible followability cannot suppress the deterioration of the characteristics caused when the nonaqueous electrolyte discharged due to the compression of the separator film cannot be returned.

On the other hand, as described in Patent Document 6, in order to supply a battery excellent in short circuit and low-temperature cycle characteristics, a separator which exhibits constant durability against an external force in a compression direction has also been proposed.

CITATION LIST

Patent Literature

[Patent Document 1] Japanese Unexamined Patent Application, First Publication No. S55-131028
[Patent Document 2] Japanese Examined Patent Application, Second Publication No. S55-32531
[Patent Document 3] Japanese Patent No. 5459139
[Patent Document 4] Japanese Unexamined Patent Application, First Publication No. 2007-087690
[Patent Document 5] Japanese Patent No. 4209985
[Patent Document 6] Japanese Patent No. 5031791
[Patent Document 7] Japanese Patent No. 5259721

SUMMARY OF INVENTION

Technical Problem

However, for example, the separator film used in the power-storage device which uses the restraint member to limit expansion and contraction from the outside of the device or includes the process of compressing the device as in the power-storage device for automobile applications requires excellent durability in the thickness direction. Furthermore, the balance between the safety such as shutdown or meltdown and thermal shrinkage ratio and the characteristics as the separator film is required.

Solution to Problem

As a result of trial and error in view of the problems described above, the present inventors discovered a polyolefin micro porous film which has further improved resistance against a load in a thickness direction of the polyolefin micro porous film included in a separator for a power-storage device, which can maintain safety, and which is excellent in balance with the characteristics as a separator film.

Features of a polyolefin micro porous film of the present invention are the following (1) to (9).

(1)

A polyolefin micro porous film according to an aspect of the present invention has a compressive elastic modulus of 95 MPa or more and 150 MPa or less. The compressive elastic modulus is preferably 100 MPa or more and 145 MPa or less, more preferably 105 MPa or more and 145 MPa or less, and even more preferably 105 MPa or more and 130 MPa or less.

(2)

In the polyolefin micro porous film according to the aspect, after a pressure of 17.3 MPa is applied thereto, a Gurley value obtained when the pressure is released may be higher than a Gurley value obtained before the pressure is applied thereto, and an increase rate of the Gurley value obtained when the pressure is released may be 0.5% or more and 29.0% or less.

(3)

In the polyolefin micro porous film according to the aspect, after a pressure of 11.5 MPa is applied thereto, a Gurley value obtained when the pressure is released may be higher than a Gurley value obtained before the pressure is applied thereto, and an increase rate of the Gurley value obtained when the pressure is released may be 0.1% or more and 6.0% or less.

In addition, after a pressure of 5.8 MPa is applied thereto, a Gurley value obtained when the pressure is released may be higher than a Gurley value obtained before the pressure is applied thereto, and an increase rate of the Gurley value may be 0.0% or more and 2.9% or less.

In the range of 11.5 MPa or more and 23.1 MPa or less, the increase rate of Gurley according to the applied pressure is approximately 0.01 to 2.50%/MPa. In addition, in a range of 11.5 MPa or more and 17.3 MPa or less, the increase rate of the Gurley value according to an increase in the applied pressure is approximately 0.01 to 1.70%/MPa, and preferably 0.01 to 1.00%/MPa.

(4)

In addition, in the polyolefin micro porous film according to the aspect, a surface roughness (Ra) of a film surface is measured for a front surface and a rear surface, and an average value (Ra(ave)) thereof may be in a range of 0.01 µm to 0.30 µm. The surface roughness of the film surface is more preferably in a range of 0.05 to 0.25 µm, and even more preferably in a range of 0.05 to 0.23 µm.

Regarding the thickness of the polyolefin micro porous film used in a separator film (hereinafter simply referred to as "separator") for a power-storage device, the precision is also important. When the separator is used for applications in which the separator is compressed in the thickness direction, in a case where the value of the surface roughness Ra is large, the surface of the separator is crushed by the compression, the thickness of the separator itself also changes, and the size of micro pores formed in the separator also changes. Therefore, the surface roughness is preferably adjusted to substantially 0.30 µm or less. The surface roughness becomes substantially 0.01 µm or more due to the size of pores formed in the separator.

(5)

In the polyolefin micro porous film according to the aspect, an amount of strain in a stress-strain curve in a compression direction obtained when 2.7 MPa is applied thereto may be 0.010 to 0.055. The amount of strain is preferably 0.020 to 0.050, and more preferably 0.030 to 0.050.

(6)

In the polyolefin micro porous film according to the aspect, a thermal shrinkage in a TD direction may be −1.0% to 1.0%, and a thermal shrinkage ratio in an MD direction may be 0.5% to 8.0%. The thermal shrinkage in the TD direction is preferably −0.5% to 1.0%.

(7)

In the polyolefin micro porous film according to the aspect, it is preferable that a shutdown temperature (SD temperature; pore closing temperature) is 130° C. to 140° C. and a meltdown temperature (MD temperature; pore closing maintenance temperature) is 175° C. or higher and 190° C. or lower.

(8)

In the polyolefin micro porous film according to the aspect, a Gurley value may be 100 to 600 sec/100 cc, a film thickness may be 10 to 40 µm, a puncture strength may be 200 to 700 gf, and a maximal pore diameter by a mercury porosimeter may be in a range of 0.05 to 0.30 µm.

(9)

In the polyolefin micro porous film according to the aspect, polyolefin may contain at least one of polyethylene and polypropylene. In particular, a configuration is preferable in which the polyolefin micro porous film is made of polyethylene and polypropylene resins and a polypropylene layer is provided on at least one surface of a polyethylene layer. Furthermore, the polyolefin micro porous film according to the aspect preferably has a layer structure in which the polypropylene layer is provided on both surfaces of the polyethylene layer.

(10)

A power-storage device according to another aspect of the present invention includes: a positive electrode; a negative electrode; the polyolefin micro porous film according to the aspect interposed between the positive electrode and the negative electrode; and a nonaqueous electrolytic solution with which at least the polyolefin micro porous film is impregnated, in which a resistance value obtained by DC-R measurement performed in a state in which a pressure of 2.7 MPa is applied thereto is 100.1% to 105.0% when a resistance value obtained before the pressure is applied thereto is assumed to be 100%.

As a separator for the power-storage device that uses the polyolefin micro porous film according to the aspect, those obtained by applying an organic substance such as a fluororesin or an inorganic substance such as an aluminum compound or a titanium compound onto the polyolefin micro porous film may also be used.

(11)

In the power-storage device according to the aspect of the present invention, it is possible to provide a heat-resistant porous layer primarily containing inorganic particles on the polyolefin micro porous film according to the aspect through a coating process or the like. The heat-resistant porous layer primarily contains heat-resistant fine particles and contains a resin binder. The thickness of the heat-resistant porous layer is 1 to 15 µm, preferably 1.5 to 10 µm, and even more preferably 2.0 to 8.0 µm. When the thickness of the heat-resistant coating layer is 1 µm or less, required heat resistance is not obtained. When the thickness of the heat-resistant coating layer is 15 µm or more, the adhesion of the heat-resistant fine particles deteriorates, and problems such as deficiency of the fine particles occur.

The heat-resistant porous layer contains, as the resin binder, 0.1 to 5 parts by mass of a polymer of N-vinylacetamide or a water-soluble cellulose derivative with respect to 100 parts by mass of heat-resistant fine particles and 1 part by mass or more of a crosslinked acrylic resin with respect to 100 parts by mass of the heat-resistant fine particles, and the amount of the resin binder in the heat-resistant porous layer is preferably 1.1 to 30 parts by mass with respect to 100 parts by mass of the heat-resistant fine particles. In addition, the 180° peel strength between the resin porous film and the heat-resistant porous layer is preferably 0.6 N/cm or higher and 5 N/cm or lower.

Advantageous Effects of Invention

The polyolefin micro porous film according to the aspect of the present invention has excellent durability in the thickness direction. Therefore, by using the polyolefin micro porous film according to the aspect of the present invention as the separator for a power-storage device, the separator film exhibits excellent resistance even in a case of using a restraint member that limits expansion and contraction from the outside of the power-storage device or in a case of performing a process of compressing the device. That is, the separator film which uses the polyolefin micro porous film according to the aspect of the present invention can maintain the characteristics of the power-storage device even in a case of being compressed.

DESCRIPTION OF EMBODIMENTS

Figure 1:
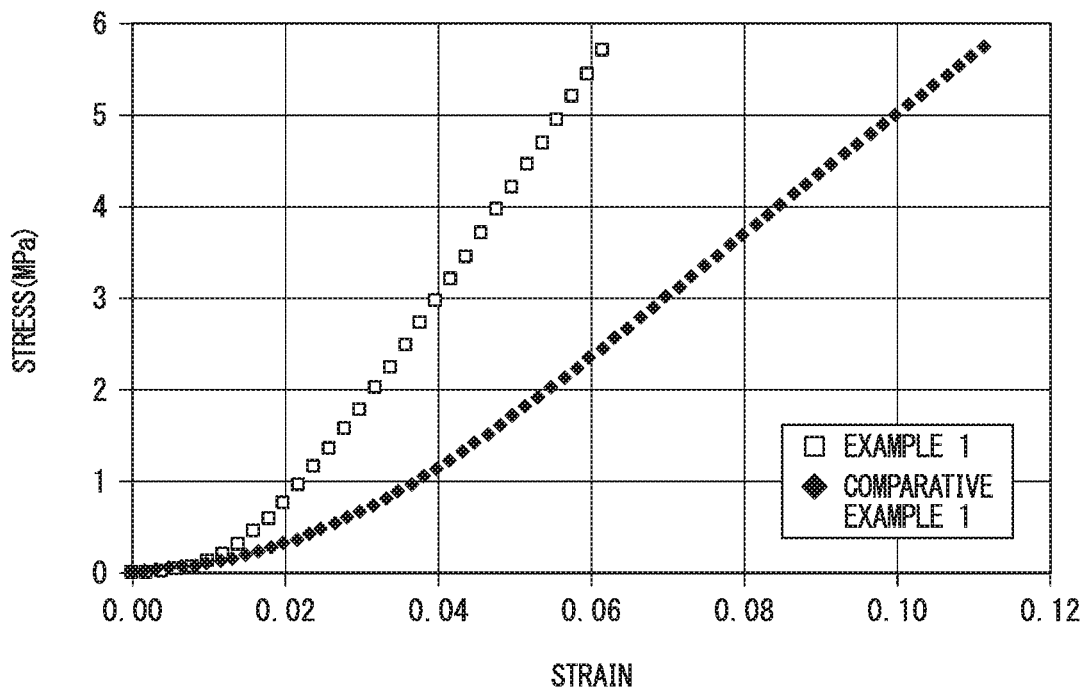
FIG. 1 shows stress-strain curves in Example 1 and Comparative Example 1.

A polyolefin micro porous film according to an aspect of the present invention exhibits excellent durability in a thickness direction even in a separator for a power-storage device which uses a restraint member to limits expansion and contraction from the outside of the device or includes a process of compressing the device, for example, as in a power-storage device for automobile applications. As a result, it was found that by using the polyolefin micro porous film according to the aspect of the present invention as a separator, the characteristics of the power-storage device can be maintained. The present invention will be described below by way of an example, but the contents of the present invention are not limited to the following contents thereof.

Hereinafter, a separator used in a power-storage device such as a lithium-ion secondary battery or a lithium-ion capacitor will be described. The shape of the separator may be appropriately adjusted, for example, according to the shape of the lithium-ion secondary battery. Similarly, the shapes of a positive electrode and a negative electrode may also be appropriately adjusted according to the shape of the lithium-ion secondary battery.

The separator is formed of, for example, a polyolefin micro porous film and has a single-layer structure or a multi-layer structure. The separator may be formed of only a resin layer made of polyolefin, or may also have a resin layer made of polyolefin and a porous heat-resistant layer formed on the surface of the resin layer. In addition, the separator may further include an adhesive layer. In the case where the heat-resistant layer is provided, it can be expected that the heat-resistant layer limits thermal shrinkage of the resin layer and enhances a function of preventing an internal short circuit of the battery caused by breakage of the resin layer. The heat-resistant layer may be provided on only one surface of the resin layer or both surfaces thereof.

As the resin material of the polyolefin micro porous film, for example, a polyolefin resin such as PE (polyethylene) or PP (polypropylene) can be used. The structure of the resin layer may be a single-layer structure or a multi-layer structure. As the multi-layer structure, a three-layer structure constituted of a PP layer, a PE layer laminated on the PP layer, and a PP layer laminated on the PE layer can be employed. The number of layers of the multi-layer structure is not limited to three, and may be two or four or more.

As the separator, for example, a uniaxially stretched or biaxially stretched polyolefin micro porous film may be suitably used. A polyolefin micro porous film uniaxially stretched in the longitudinal direction (MD direction) has a low degree of thermal shrinkage in a width direction while having appropriate strength and is thus particularly preferable. When the uniaxially stretched polyolefin micro porous film is used as the separator, in a case where the uniaxially stretched polyolefin micro porous film is wound together with long sheet-like positive and negative electrodes, it is also possible to limits thermal shrinkage in the longitudinal direction. Therefore, the polyolefin micro porous film uniaxially stretched in the longitudinal direction is particularly suitable as a separator included in a wound electrode body.

The thickness of the polyolefin micro porous film is not particularly limited. The thickness of the polyolefin micro porous film is, for example, preferably about 8 µm to 40 µm. When the thickness of the polyolefin micro porous film is too thick, there is a tendency toward a decrease in ionic conductivity. Contrary to this, when the thickness of the polyolefin micro porous film is too thin, there is a tendency toward film breakage. The thickness of the polyolefin micro porous film can be obtained by analyzing an image of a cross-section of the micro porous film taken by a scanning electron microscope (SEM), or by a dot type thickness measuring apparatus or the like.

Hereinafter, a process of producing a web for producing the separator described above will be described.

The polyolefin micro porous film according to the aspect of the present invention is produced through three processes including a web producing process, a lamination process, and a stretching process.

Polypropylene and polyethylene included in each layer may have the same molecular weight or different molecular weights in each layer. It is preferable that polypropylene has high tacticity. In addition, as polyethylene, high-density polyethylene with a density of 0.960 or higher is more preferable. As polyethylene, medium-density polyethylene may also be used. Polypropylene and polyethylene may contain additives such as a surfactant, an antiaging agent, a plasticizer, a flame retardant, or a colorant.

[Web Process]

A web film for producing the separator may have a uniform thickness and a property that form pores by being stretched after a plurality of web films are laminated. A plurality of types of web films is produced according to the configuration of the separator. As a forming method of the web film, melt forming using a T-die is suitable. Alternatively, an inflation method, a wet solution method, or the like may also be adopted. In a case where the web film is subjected to the melt forming using the T-die, the melt forming is generally performed at a temperature higher than a resin melting temperature by 20° C. to 60° C. In addition, a draft ratio at this time is preferably set to 10 to 1000 and more preferably set to 50 to 500. The take-up speed of the web film is not particularly limited, and forming is generally performed at 10 to 200 m/min. The take-up speed affects the characteristics of the ultimately obtained polyolefin micro porous film (the birefringence and elastic recovery ratio affect the pore diameter, porosity, interlaminar peel strength, mechanical strength, and the like of the polyolefin micro porous film after being stretched) and is thus one of important factors. In addition, in order to limit the surface roughness of the polyolefin micro porous film to a predetermined value or less, the uniformity of the thickness of the web film is important. It is preferable that the coefficient of variation (C.V.) in the thickness of the web is adjusted to be in a range of 0.001 to 0.030.

After the web film is laminated or the web film is formed in a multi-layer web extrusion apparatus, fine particles may be mixed in the resin layer that is supposed to become the external layer of the web film (multi-layer film). The fine particles function as a lubricant of the web film. It is preferable that the fine particles are mixed in an amount that does not affect the surface roughness of the web film or the surface roughness of the porous film after the stretching process.

It is preferable to use, as the fine particles, particles made of an inorganic insulator (hereinafter, simply referred to as "inorganic insulator particles"). The inorganic insulator particles are an inorganic material having electrical insulation properties. The inorganic insulator particles to be mixed in the resin layer preferably have an oxidation potential of +4.5 V or higher with respect to lithium. Due to the sufficiently high oxidation potential, the reliability and safety in a case where the polyolefin micro porous film containing the inorganic insulator particles is used as the separator for the lithium-ion secondary battery are increased. In addition, the electrochemical stability of the lithium-ion secondary battery is also increased. From this viewpoint, the oxidation potential of the inorganic insulator particles is more preferably +5.0 V or higher with respect to lithium.

As the inorganic insulator forming the inorganic insulator particles, oxides, hydroxides, inorganic nitrides, sparingly soluble ionic crystals, covalent crystals, clay, and the like can be used. As the oxides and hydroxides, those primarily containing one or two or more inorganic elements selected from the group consisting of Si, Al, Ti, Mg, Zn, Na, Ca, and Li can be employed. As the inorganic nitrides, aluminum nitride, silicon nitride, and the like can be employed. As the sparingly soluble ionic crystals, calcium fluoride, barium fluoride, barium sulfate, and the like can be employed. As the covalent crystals, silicon, diamond, and the like can be employed. As the clay, montmorillonite and the like can be employed.

Regarding the oxide primarily containing a specific element, the mass ratio of the specific element is preferably 50 mass % or more in an amount of the oxide. For example, as an oxide of a single element as the oxide, silica ($SiO_2$), alumina ($Al_2O_3$), $TiO_2$, magnesia, zinc oxide, and the like can be employed. Examples of an oxide of two or more inorganic elements (composite oxide) include aluminosilicate and $MgAl_2O_4$. Aluminosilicate is represented by $x1M1_2O.x2M2O.yAl_2O_3.zSiO_2.nH_2O$. M1 is one or more selected from Na and Li, M2 is one or more selected from Ca, Ti, and Mg, x1 and x2 are each independently a number from 0 to 2.0, y is a number from 0.5 to 2.0, z is a number from 1.0 to 5.0, and n is a number of 0 or more. As the hydroxide of an inorganic metal, aluminum hydroxide and the like can be employed. The oxides or hydroxides of inorganic elements include substances derived from mineral resources or artifacts thereof. As the inorganic insulator, one or two or more inorganic insulators may be used in combination. As the inorganic insulator particles, any of the above-described materials can be used, and a composite oxide such as aluminosilicate is particularly preferable.

The average particle diameter D of the inorganic insulator particles is preferably 0.1 μm or more and 10 μm or less, more preferably 0.5 μm or more and 5 μm or less, and even more preferably 1 μm or more and 3 μm or less. In addition, the amount of the added inorganic insulator particles is, for example, preferably about 500 to 8000 ppm, more preferably 1000 to 6000 ppm, and even more preferably 2500 to 5000 ppm in terms of weight ratio with respect to the added resin layer.

[Lamination Process]

A process of laminating a polypropylene film and a polyethylene film produced in the web process will be described.

The polypropylene film and the polyethylene film are laminated by thermal compression bonding. Lamination of a plurality of films is performed through the thermal compression bonding by passing a laminated film between heated rolls. Specifically, each film is wound from a plurality of sets of web roll stands, and the films are laminated and nipped between the heated rolls such that the films are compression-bonded and laminated. During the lamination, the thermal compression bonding needs to be performed so as not to substantially decrease the birefringence and the elastic recovery ratio of each film. The layer configuration may be a case of a three-layer configuration, a two-layer configuration, or the like and is not limited. Examples of the case of a three-layer configuration include a (PP/PE/PP) configuration laminated such that the front and the rear of three layers are made of polypropylene and the center is made of polyethylene, that is, the outer layers are made of polypropylene and the inner layer is made of polyethylene, and a (PE/PP/PP) configuration laminated such that the outer layers are made of polyethylene and the inner layer is made of polypropylene. As the case of a two-layer configuration, there is a (PP/PE) configuration in which polypropylene and polyethylene are adhered to each other. Although the layer configuration is not limited, the (PP/PE/PP) configuration in which the three layers are laminated such that the outer layers are made of polypropylene and the inner layer is made of polyethylene is most preferable. This configuration is less likely to curl and is less susceptible to external damage. In addition, the polyolefin micro porous film having this configuration is also excellent in heat resistance, mechanical strength, and the like. Furthermore, the characteristics such as safety and reliability in a case where the polyolefin micro porous film having this configuration is used as the separator for a power-storage device are satisfied.

The temperature of the rolls heated for thermal compression bonding of a plurality of web films (thermal compression bonding temperature) is preferably 120° C. to 160° C., and more preferably 125° C. to 150° C. When the temperature is too low, the peel strength between the films is weak, and peeling occurs in the subsequent stretching process. Contrary to this, when the temperature is too high, polyethylene is melted, and thus the birefringence and elastic recovery ratio of the film are significantly reduced. The peel strength of the polyolefin micro porous film is suitably in a range of 3 to 90 g/15 mm. The thickness of the laminated film is not particularly limited, and is generally 10 to 60 μm.

[Stretching Process]

In the laminated film, the layers of PP and PE are made porous simultaneously in the stretching process.

The stretching process is performed in four zones including a heat treatment zone (oven 1), a cold stretching zone and a hot stretching zone (oven 2), and a heat fixing zone (oven 3).

The laminated film is heat-treated in the heat treatment zone before being stretched. The heat treatment is performed in a heated air convection oven or a heated roll. The heat treatment of the laminated film is performed while the laminated film has a fixed length or is pulled under tension so as not to cause the length thereof to increase by 10% or more. The heat treatment temperature is preferably in a range of 110° C. to 150° C., and more preferably 115° C. to 140° C. When the temperature is too low, pore formation is insufficient, and when the temperature is too high, polyethylene is melted. The heat treatment time may be about three seconds to three minutes.

The heat-treated laminated film is stretched in the cold stretching zone. Thereafter, the laminated film passes through the hot stretching zone to become porous, resulting in a laminated porous film. Polypropylene and polyethylene cannot become sufficiently porous by only one of the stretching processes, and the characteristics when the laminated porous film (the polyolefin micro porous film) is used as a separator for a battery deteriorate.

The temperature in the cold stretching zone is preferably −20° C. to +50° C., and more preferably 20° C. to 40° C. When the stretching temperature is too low, the film is easily broken during operation. On the other hand, when the stretching temperature is too high, forming pores becomes insufficient. The low-temperature stretching ratio is preferably in a range of 3% to 200%, and more preferably in a range of 5% to 100%. When the low-temperature stretching ratio is too low, only a low porosity is obtained, and when the low-temperature stretching ratio is too high, a predetermined porosity and a predetermined pore diameter are not obtained.

The low-temperature stretched laminated film is subjected to high-temperature stretching in the hot stretching zone. The high-temperature stretching temperature is preferably 70° C. to 150° C., and more preferably 80° C. to 145° C. When the temperature deviates from this range, it is difficult to achieve sufficient pore formation. The high-temperature stretching ratio (maximum stretching ratio) is in a range of 100% to 400%. When the maximum stretching ratio is too low, the gas permeability of the laminated porous film (the polyolefin micro porous film) decreases, and when the maximum stretching ratio is too high, the gas permeability of the laminated porous film (the polyolefin micro porous film) becomes too high.

After the low-temperature stretching and the high-temperature stretching, thermal relaxation is performed in an oven. The thermal relaxation is a process of reducing the film length after the stretching by 10% to 300% in advance through thermal shrinkage in order to prevent contraction of the film in the stretching direction due to residual stress exerted during the stretching. The temperature during the thermal relaxation is preferably 70° C. to 145° C., and more preferably 80° C. to 140° C. When the temperature during the thermal relaxation is too high, the PE layer is melted, and thus it is difficult to use the film as the separator. In addition, when the temperature during the thermal relaxation is too low, the thermal relaxation is insufficiently performed, and the thermal shrinkage ratio of the film when used as the separator increases. That is, the thermal shrinkage ratio of the product increases, which is not preferable for the separator for a power-storage device.

Subsequently, the heat treated-film that has passed through the hot stretching zone is subjected to a heat treatment while the dimensions thereof in the hot stretching direction are regulated so as not to change in the heat fixing zone. The heat fixing is performed in the heated air convection oven or the heated roll. Even in this case, the heat fixing is performed while the heat-treated film has a fixed length or is pulled under tension so as not to cause the length thereof to increase by 10% or more. The heat fixing temperature is preferably in a range of 110° C. to 150° C., and more preferably in a range of 115° C. to 140° C. When the heat fixing temperature is low, a sufficient heat fixing effect is not obtained, and the thermal shrinkage ratio increases. When the heat fixing temperature is too high, polyethylene is melted, which is inappropriate.

The polyolefin micro porous film according to the aspect of the present invention is obtained by producing a web film which is excellent in thickness precision during the production of the web film, laminating the web film, and performing heat fixing after stretching and thermal shrinkage. Therefore, the polyolefin micro porous film has excellent compression characteristics, good dimensional stability, and interlaminar peel strength high enough to satisfy the desired object.

In order to produce the polyolefin micro porous film as described above, it is important to adjust the coefficient of variation (C.V.) of the thickness in the web process to be in a range of 0.001 to 0.03. A method of producing the polyolefin micro porous film may use, as well as the above-described processes in which a plurality of web films are separately produced and laminated into multiple layers, a method in which resins extruded by individual extruders are joined in a die and are simultaneously extruded.

As the web film having the multi-layer structure obtained as described above is subjected to the same stretching process as described above, the polyolefin micro porous film having excellent compression characteristics, good dimensional stability, and interlaminar peel strength high enough to satisfy the desired object is obtained.

Furthermore, the polyolefin micro porous film produced from the web film in which the fine particles are mixed has improved slippage on a component of a metallic winder, which is the center axis, particularly when a wound battery is produced. Therefore, the yield in the battery production process can be improved.

A heat-resistant coating layer may be provided on one surface or both surfaces of the polyolefin micro porous film according to the aspect of the present invention by mixing inorganic particles and a binder together and performing a process of applying the mixture thereto, or the like. Furthermore, a bonding layer may also be provided by applying a fluororesin.

Particularly, even when the heat-resistant coating layer is provided, it is preferable that the compression characteristics do not significantly deteriorate. For example, the heat-resistance coating layer can be obtained by a known method described in Patent Document 7.

The porosity of the polyolefin micro porous film according to the aspect of the present invention used as the separator for a power-storage device is preferably 30% to 80%, and more preferably 35% to 60%. In addition, the maximal pore diameter of the polyolefin micro porous film is preferably 0.02 to 2 μm, and more preferably 0.08 to 0.5 μm. The porosity and the maximal efficiency slightly vary depending on the selected production conditions. When the porosity is too small, the function needed when the polyolefin micro porous film is used as the separator for a battery is insufficiently obtained. When the porosity is too large, the mechanical strength needed when the polyolefin micro porous film is used as the separator for a battery deteriorates. When the maximal pore diameter is too small, the mobility of ions is poor when the polyolefin micro porous film is used as the separator for a battery, and the resistance increases. When the maximal pore size is too large, the mobility of ions is too high, which is inappropriate.

The Gurley value of the polyolefin micro porous film according to the aspect of the present invention is preferably 80 to 1500 sec/100 cc, and more preferably 100 to 800 sec/100 cc. In the case where the polyolefin micro porous film is used as the separator for a battery, when the Gurley value is too high, the flow of ions is limited. Contrary to this, when the Gurley value is too low, the flow of ions is too fast, which results in an increase in the temperature rise at the time of failure. The interlaminar peel strength of the polyolefin micro porous film is preferably 3 to 80 g/15 mm. When the interlaminar peel strength is low, there may be cases where, for example, the film is peeled away during the process of producing the separator for a battery, and curl, elongation, and the like are likely to occur, which causes problems in terms of product quality. The overall thickness of the polyolefin micro porous film is appropriately 5 to 40 μm in terms of the mechanical strength, performance, miniaturization, and the like for the separator for a power-storage device.

A heat-resistant porous layer contains a filler and a binder. The heat-resistant porous layer is layered on the polyolefin micro porous film. The heat-resistant porous layer is obtained by preparing a slurry for forming the heat-resistant porous layer by mixing the filler, the binder, and a solvent together, applying the slurry onto the polyolefin micro porous film, and drying the slurry.

As the filler, particles selected from at least one of an inorganic substance, an inorganic oxide, and an inorganic hydroxide with high electrical insulation properties and a higher melting point than those of the polyethylene layer and the polypropylene layer can be used. For example, one or more selected from alumina, boehmite, magnesium hydroxide, magnesium carbonate, magnesia, titania, silica, zirconia, zinc oxide, iron oxide, ceria, yttria, and the like and prepared in the form of particles may be used.

The shape of the filler is not particularly limited. For example, a filler in the form of particles, fiber, flakes, or the like can be used, and a filler in the form of particles is suitable. The average particle diameter of the filler may be, for example, about 0.1 μm to 2.5 μm, and is preferably 0.2 μm to 1.0 μm and more preferably 0.3 μm to 0.8 μm.

As the binder, for example, a polymer of N-vinylacetamide, an acrylic resin (for example, a resin primarily containing a polymer of acrylate ester), styrene butadiene rubber (SBR), a polyolefin resin such as PE and PP, a cellulose-based resin such as carboxymethyl cellulose (CMC), a fluororesin such as polyvinylidene fluoride (PVDF), or the like can be used. These may be used singly or a combination of two or more thereof may be used types.

The form of the binder is not particularly limited. A binder in the form of particles may also be used or a binder prepared in the form of a solution may also be used. In a case where a binder in the form of particles is used, the particle diameter of the binder is not particularly limited, and for example, a binder with an average particle diameter of about 0.05 μm to 0.5 μm may be used. In addition, a resin binder containing 0.1 to 5 parts by mass of a polymer of N-vinylacetamide or a water-soluble cellulose derivative with respect to 100 parts by mass of heat-resistant fine particles and 1 part by mass of a crosslinked acrylic resin with respect to 100 parts by mass of the heat-resistant fine particles may be used, and the amount of the resin binder in the heat-resistant porous layer may be 1.1 to 30 parts by mass with respect to 100 parts by mass of the heat-resistant fine particles.

As a method of applying the slurry onto the polyolefin micro porous film, for example, the slurry can be applied using a die coater, a gravure roll coater, a reverse roll coater, a kiss roll coater, a dip roll coater, a bar coater, an air knife coater, a spray coater, a brush coater, or a screen coater.

As the drying condition after applying the slurry, for example, a method of maintaining a temperature lower than the melting point of the PE layer (for example, about 70° C. to 130° C.) for drying, a method of maintaining a low temperature at reduced pressure, or the like can be employed.

For example, the thickness of the heat-resistant porous layer after being dried is preferably about 1 μm to 15 μm, more preferably about 1.5 μm to 10 μm, and even more preferably 2.0 to 8.0 μm. When the heat-resistant porous layer is too thick, the handleability and workability of the separator deteriorate, and there may be cases where problems such as cracking or peeling are likely to occur. When the heat-resistant porous layer is too thin, the short circuit prevention effect of the heat-resistant porous layer is weakened, and problems such as a reduction in the property of holding the electrolytic solution may occur. When the thickness of the heat-resistant coating layer is 1 μm or less, required heat resistance is not obtained. When the thickness of the heat-resistant coating layer is 15 μm or more, the adhesion of the fine particles deteriorates, and problems such as deficiency of the fine particles occur. The peel strength between the polyolefin micro porous film and the heat-resistant porous layer is not particularly limited but is preferably high.

[Nonaqueous Electrolytic Solution]

As a nonaqueous solvent used in the nonaqueous electrolytic solution, a cyclic carbonate and a chain ester are suitably employed. In order to synergistically improve the electrochemical characteristics in a wide temperature range, particularly at a high temperature, it is preferable that the chain ester is contained, it is more preferable that a chain carbonate is contained, and it is most preferable that both the cyclic carbonate and the chain carbonate are contained. The term "chain ester" is used as a concept including the chain carbonate and a chain carboxylic acid ester.

As the cyclic carbonate, one or two or more selected from ethylene carbonate (EC), propylene carbonate (PC), and vinylene carbonate (VC) can be employed, and a combination of EC and VC, and a combination of PC and VC are particularly preferable.

In addition, when the nonaqueous solvent contains ethylene carbonate and/or propylene carbonate, the stability of the coating formed on the electrode increases and the high-temperature and high-voltage cycle characteristics are improved. The amount of ethylene carbonate and/or propylene carbonate is preferably 3 vol % or more, more preferably 5 vol % or more, and even more preferably 7 vol % or more with respect to the total volume of the nonaqueous solvent. The upper limit thereof is preferably 45 vol % or less, more preferably 35 vol % or less, and even more preferably 25 vol % or less.

As the chain ester, methyl ethyl carbonate (MEC) as an asymmetric chain carbonate, dimethyl carbonate (DMC), diethyl carbonate (DEC) as a symmetric chain carbonate, and ethyl acetate (hereinafter, referred to as EA) as the chain carboxylic acid ester are suitably employed. Among the chain esters, a combination of chain esters which are asymmetric and contain an ethoxy group, such as MEC and EA, is possible.

The amount of the chain ester is not particularly limited. The amount of the chain ester is preferably used in a range of 60 to 90 vol % with respect to the total volume of the nonaqueous solvent. When the amount thereof is 60 vol % or more, the viscosity of the nonaqueous electrolytic solution does not become excessively high, and when the amount thereof is 90 vol % or less, there is less concern about a reduction in the electrical conductivity of the nonaqueous electrolytic solution and the deterioration in the electrochemical characteristics in a wide temperature range, particularly at a high temperature.

Among the chain esters, the proportion of the volume of EA is preferably 1 vol % or more, and more preferably 2 vol % or more in the nonaqueous solvent. The upper limit thereof is more preferably 10 vol % or less, and more preferably 7 vol % or less. The asymmetric chain carbonate preferably has an ethyl group, and is particularly preferably methyl ethyl carbonate.

The ratio between the cyclic carbonate and the chain ester (volume ratio) is preferably 10:90 to 45:55, more preferably 15:85 to 40:60, and particularly preferably 20:80 to 35:65 from the viewpoint of improving the electrochemical characteristics in a wide temperature range, particularly at a high temperature.

[Electrolyte Salt]

As the electrolyte salt, a lithium salt is suitably employed.

As the lithium salt, one or two or more selected from the group consisting of $LiPF_6$, $LiBF_4$, $LiN(SO_2F)_2$, and $LiN(SO_2CF_3)_2$ is preferable, one or two or more selected from $LiPF_6$, $LiBF_4$, and $LiN(SO_2F)_2$ is more preferable, and $LiPF_6$ is most preferably used.

[Production of Nonaqueous Electrolytic Solution]

The nonaqueous electrolytic solution is obtained by, for example, a method of mixing the nonaqueous solvent and adding thereto the electrolyte salt and a composition obtained by mixing a dissolution aid and the like in specific mixing ratios with respect to the nonaqueous electrolytic solution. At this time, as a compound to be added to the nonaqueous solvent and the nonaqueous electrolytic solution that are used, it is preferable to use those which are purified in advance and thus contain an extremely small amount of impurities in a range in which the productivity is not significantly reduced.

The polyolefin micro porous film according to the aspect of the present invention can be used in the following first and second power-storage devices, and as the nonaqueous electrolyte, a gelated electrolyte can also be used as well as a liquid electrolyte. The polyolefin micro porous film according to the aspect of the present invention is preferably used as a separator for a lithium-ion battery (first power-storage device) or a lithium-ion capacitor (second power-storage device) in which a lithium salt is used as an electrolyte salt, is more preferably used for a lithium-ion battery, and even more preferably used for a lithium-ion secondary battery.

[Lithium-Ion Secondary Battery]

A lithium-ion secondary battery as the power-storage device according to the aspect of the present invention has a positive electrode, a negative electrode, and the nonaqueous electrolytic solution in which the electrolyte salt is dissolved in the nonaqueous solvent. Constituent members such as the positive electrode and the negative electrode other than the nonaqueous electrolytic solution can be used without particular limitations.

For example, as a positive electrode active material for the lithium-ion secondary battery, a composite lithium metal oxide containing one or two or more selected from the group consisting of cobalt, manganese, and nickel is used. These positive electrode active materials can be used singly or a combination of two or more thereof may be used.

As the composite lithium metal oxide, for example, one or more selected from $LiCoO_2$, $LiCo_{1-x}M_xO_2$ (here, M is one or two or more elements selected from Sn, Mg, Fe, Ti, Al, Zr, Cr, V, Ga, Zn, and Cu), $LiMn_2O_4$, $LiNiO_2$, $LiCo_{1-x}Ni_xO_2$, $LiCo_{1/3}Ni_{1/3}Mn_{1/3}O_2$, $LiNi_{0.5}Mn_{0.3}Co_{0.2}Mn_{0.3}O_2$, $LiNi_{0.8}Mn_{0.1}Co_{0.1}O_2$, $LiNi_{0.8}Co_{0.15}Al_{0.05}O_2$, a solid solution of $Li_2MnO_3$ and $LiMO_2$ (M is a transition metal such as Co, Ni, Mn, or Fe), and $LiNi_{1/2}Mn_{3/2}O_4$ are suitably employed.

The conducting agent of the positive electrode is not particularly limited as long as the conducting agent is made of an electron conductive material and does not cause a chemical change. For example, graphite such as natural graphite (flake graphite or the like) and artificial graphite, and one or two or more types of carbon black selected from acetylene black and the like can be employed.

The positive electrode can be produced in the following procedure. First, the positive electrode active material described above is mixed with the conducting agent such as acetylene black or carbon black and a binder such as polytetrafluoroethylene (PTFE), polyvinylidene fluoride (PVDF), a copolymer of styrene and butadiene (SBR), a copolymer of acrylonitrile and butadiene (NBR), or carboxymethyl cellulose (CMC). A solvent is added to the mixture and is kneaded, thereby obtaining a positive electrode mixture. The obtained positive electrode mixture is applied onto an aluminum foil, a stainless steel plate, or the like of a current collector, is dried and press-formed, and is subjected to a heat treatment under predetermined conditions.

As a negative electrode active material for the lithium-ion secondary battery, a carbon material capable of occluding or releasing lithium metal or a lithium alloy and lithium, tin (simple substance), a tin compound, silicon (simple substance), a silicon compound, and a lithium titanate compound such as $Li_4Ti_5O_{12}$ can be used singly or a combination of two or more thereof may be used.

Among these, from the viewpoint of capability of occluding and releasing lithium ions, it is more preferable to use a highly crystalline carbon material such as artificial graphite or natural graphite.

In particular, it is preferable to use artificial graphite particles having a lump structure in which a plurality of flat graphite microparticles are aggregated or bonded nonparallel to each other, or particles formed by spheroidizing flake natural graphite by repeatedly applying mechanical action such as compressive force, frictional force, or shear force thereto.

The negative electrode is obtained in the same procedure as the positive electrode described above. A negative electrode mixture is obtained by using the same conducting agent, binder, and high-boiling-point solvent as those used in the production of the positive electrode, and kneading the resultant. The obtained negative electrode mixture is applied onto a copper foil or the like of a current collector, is dried and press-formed, and is subjected to a heat treatment under predetermined conditions.

[Lithium-Lon Secondary Battery]

The structure of the lithium-ion secondary battery which is one of the power-storage devices according to the aspect of the present invention is not particularly limited. For example, a coin type battery, a cylindrical battery, a prismatic battery, or a laminated battery can be used.

For example, a wound lithium-ion secondary battery has a configuration in which an electrode body is accommodated in a battery case together with the nonaqueous electrolytic solution. The electrode body is constituted by the positive electrode, the negative electrode, and the separator. The electrode body is impregnated with at least a portion of the nonaqueous electrolytic solution.

In the wound lithium-ion secondary battery, the positive electrode includes a long sheet-like positive electrode current collector, and a positive electrode mixture layer that contains the positive electrode active material and is provided on the positive electrode current collector. The negative electrode contains a long sheet-like negative electrode current collector, and a negative electrode mixture layer that contains the negative electrode active material and is provided on the negative electrode current collector.

Like the positive electrode and the negative electrode, the separator is formed in a long sheet shape. The positive electrode and the negative electrode with the separator interposed therebetween are wound in a cylindrical shape. The shape of the electrode body after being wound is not limited to the cylindrical shape. For example, after the positive electrode, the separator, and the negative electrode are wound, a pressure is applied thereto from the side to form a flat electrode body.

The battery case includes a cylindrical-bottomed case body and a lid for closing the opening of the case body. The lid and the case body are made of, for example, metal and are insulated from each other. The lid is electrically connected to the positive electrode current collector, and the case body is electrically connected to the negative electrode current collector. The lid may also serve as a positive electrode terminal, and the case body may also serve as a negative electrode terminal.

The lithium-ion secondary battery can be charged and discharged at −40° C. to 100° C. preferably −10° C. to 80° C. In addition, as a measure to increase the internal pressure of the wound lithium-ion secondary battery, a measure to provide a safety valve in the lid of the battery, or a measure to provide a cutout in a member of the case body, a gasket, or the like of the battery can also be adopted. In addition, as a safety measure to prevent overcharging, a current interruption mechanism for interrupting current by measuring the internal pressure of the battery may also be provided in the lid.

[Production of Wound Lithium-Ion Secondary Battery]

An example of a production procedure for the lithium-ion secondary battery will be described below.

First, each of the positive electrode, the negative electrode, and the separator is prepared. Next, these are superimposed and wound in a cylindrical shape to assemble the electrode body. Next, the electrode body is inserted into the case body, and the nonaqueous electrolytic solution is injected into the case body. Accordingly, the electrode body is impregnated with the nonaqueous electrolytic solution. After injecting the nonaqueous electrolytic solution into the case body, the case body is covered with the lid, and the lid and the case body are sealed. The shape of the electrode body after being wound is not limited to the cylindrical shape. For example, after the positive electrode, the separator, and the negative electrode are wound, a pressure may be applied from the side to form a flat electrode body.

Although the wound lithium-ion secondary battery has been described above, the present invention is not limited thereto, and may also be applied to a laminated lithium-ion secondary battery.

For example, the positive electrode or the negative electrode may be sandwiched between a pair of separators and packaged. In this embodiment, the electrodes are packaged electrodes. The separators have a size slightly larger than the electrodes. While the bodies of the electrodes are interposed between the pair of separators, tabs extending from the end portions of the electrodes are allowed to protrude outward from the separators. The overlapping side edges of the pair of separators are joined together for packaging, one electrode and the other electrode packaged by the separators are alternately laminated and impregnated with the electrolytic solution, thereby producing a laminated battery. At this time, for a reduction in thickness, the separators and the electrodes may be compressed in the thickness direction.

The lithium-ion secondary battery can be used as a secondary battery for various applications. For example, the lithium-ion secondary battery can be suitably used as a power source for a driving source such as a motor that is mounted in a vehicle such as an automobile to drive the vehicle. The type of the vehicle is not particularly limited, but examples thereof include a hybrid vehicle, a plug-in hybrid vehicle, an electric vehicle, and a fuel cell vehicle. The lithium-ion secondary battery may be used singly, or a plurality of batteries may be connected in series and/or in parallel so as to be used.

[Lithium-Ion Capacitor]

Another example of the power-storage device according to the aspect of the present invention is a lithium-ion capacitor. The lithium-ion capacitor includes the polyolefin micro porous film according to the aspect of the present invention, a nonaqueous electrolytic solution, a positive electrode, and a negative electrode, and stores energy using intercalation of lithium ions into a carbon material such as graphite as the negative electrode. As the positive electrode, for example, those using an electric double layer between an activated carbon electrode and the electrolytic solution, those using a doping/dedoping reaction of a n-conjugated polymer electrode, and the like are used. The electrolytic solution contains at least a lithium salt such as $LiPF_6$.

EXAMPLES

Next, the present invention will be described in more detail with reference to examples, but the present invention is not limited to these examples.

[Peel Strength Measurement]

As test pieces of TD: 15 mm×MD: 200 mm from a stretched film sample, a total of six samples were taken from the center portion, both end portions (10 mm inward from the end portions), an A surface, and a B surface. The interlaminar peel strength was evaluated by a tensile tester (RTC-1210A) manufactured by ORIENTEC Co., LTD. As the measurement conditions, a load cell of 100 N was used, a chuck-to-chuck distance was 50 mm, and a crosshead speed was 50 mm/min. In addition, a measurement specimen, a specimen was created by peeling a portion of a measurement adhesion surface in advance and was set in the tensile tester in a T state. After starting peeling, the average value of peel strengths at the time of peeling by 120 mm, 140 mm, 160 mm, 180 mm, and 200 mm was evaluated as the peel strength.

[Film Thickness Measurement]

Five test pieces having a tape shape over the entire width by MD 50 mm were prepared from the specimen. The five test pieces were stacked and thicknesses were measured at equal intervals by an electric micrometer manufactured by Feinpruf GmbH (Millitron 1240 probe 5 mmφ (flat surface, needle pressure 0.75 N)) such that the number of measurement points was 25. The value of ⅕ of the measurement value was used as the thickness for each point.

[Coefficient of Variation (C.V.) of Thickness]

The coefficient of variation (C.V.) of the film thickness was obtained by dividing the standard deviation of thickness measurement results at 25 points in the width direction $$\sqrt{(\sigma^2)}$$

by the arithmetic average $$(\overline{X})$$

The coefficient of variation (C.V.) was evaluated as an indicator of thickness variation in the film width direction.

[Measurement of Air Permeability (Gurley Value)]

A test piece with the entire width by 80 mm in the MD direction was taken from the stretched film, and measurement was performed on three points including the center portion and the right and left end portions (50 mm inward from the end surfaces) using a B type Gurley densometer (manufactured by Toyo Seiki Co., Ltd.) according to JIS P 8117. The average value of the 3 points was evaluated as a Gurley value.

[Measurement of Tensile Strength and Tensile Elongation]

Measurement was performed according to ASTM D-822.

Three test pieces having a strip shape with a width of 10 mm and a length of 100 mm were respectively taken from the center portion and right and left end portions (10 mm inward from the end surfaces) in the width direction (TD) and the length direction (MD).

Measurement was performed by the tensile tester (RTC-1210A by ORIENTEC Co., LTD.) using a load cell of 100 N under the condition that the chuck-to-chuck distance was 50 mm and the crosshead speed was 50 mm/min.

The tensile strength was calculated by the following expression using the load W (kg) at the time of breakage of the test piece and the cross-sectional area S (mm², the average value of measured thicknesses was used as the thickness) of the test piece.

$$\text{Tensile Strength (kg/mm}^2) = \frac{W}{S}$$

The tensile elongation was calculated by the following expression using the gauge length $L_0$ (mm) of the test piece before the test and the gauge distance L (mm) at the time of breakage.

$$\text{Tensile Strength (\%)} = \frac{L - L_0}{L} \times 100$$

The tensile strength in the MD direction was rounded from the second decimal place to the first decimal place. The tensile strength in the TD direction was rounded from the third decimal place to the second decimal place.

The tensile elongation was rounded from the first decimal place to an integer.

The average value of the measurement values was evaluated as the tensile strength and the tensile elongation.

[Puncture Strength and Puncture Elongation]

A test piece having a tape shape over the entire length in the TD direction by about 30 mm in the MD direction was taken from the stretched film. A needle test attachment with R=0.5 mm was attached to a handy compression tester manufactured by Kato Tech Co., Ltd. and the load at which the test piece was broken when the center of the fixed test piece was pierced at a speed of 90 mm/min was measured.

Twenty measurements were performed, and the average of the twenty pieces was used as the puncture strength.

[Basis Weight]

Two test pieces of 100 mm×100 mm were taken from both sides in the width direction of the specimen using a mold and the weight of each of the two test pieces taken was measured up to 0.1 mg.

From the measured weight, the basis weight was calculated using the following expression.

$$\text{Basis Weight (g/m}^2) = \frac{\text{(Test piece weight (g)} \times 100 \times 100)}{\text{Test piece area (100 cm}^2)}$$

The result was rounded from the third decimal place to the second decimal place such that the average value of the two was obtained.

[Thermal Shrinkage Ratio]

Test pieces (200×200 mm) were taken from the specimen at 10 mm inward from both sides. A gauge with a gauge distance of 180 mm was marked on the center portion at one point in each of the width direction (TD) and the length direction (MD) of each of the test pieces, and the gauge dimension was measured with a steel scale. The specimen with the marked gauge dimension was nipped by paper and was subjected to a heat treatment in a hot air convection type: DK-43 manufactured by Yamato Scientific Co., Ltd. at 105° C. for two hours. The specimen subjected to the heat treatment was taken out while being nipped by the paper and was left to cool at room temperature for 60 minutes, and the gauge dimension was measured with the steel scale.

The heating shrinkage ratio was calculated by the following expression by using the gauge length before the heating as L1 (mm) and using the gauge length after the heating as L2 (mm).

$$\text{Heating shrinkage ratio (\%)} = \frac{L_1 - L_2}{L_1} \times 100$$

[Compressive Elastic Modulus]

A 50 mm square separator sample was laminated to produce a 5 mm thick sample.

A 10 mmφ metal cylinder was pressed against the sample, and a stress-strain curve in the compression direction was created by using a load cell of 500 N in RTC-1250A manufactured by ORIENTEC Co., LTD. under the condition of a chuck loss head speed of 0.5 mm/min. From the slope of a part where the slope of the stress-strain curve was constant, the compressive elastic modulus was calculated.

Here, stress is the compressive load (N) per unit area (mm$^2$)=the compressive stress (N/mm$^2$), and the unit thereof is MPa. For example, the stress in a case where a load of 100 N was applied to the 10 mm$\phi$ metal cylinder is 100 N/(5 mm×5 mm×π)≈1.27 MPa. Strain is a value obtained by dividing the amount of displacement deformed when the compressive stress is applied, by the initial thickness (5 mm), and has no unit. For example, in a case where deformation from 5 mm as the initial thickness to 4.8 mm had occurred by the test, the amount of displacement becomes 0.2 mm, and the amount of strain becomes 0.2 mm/5 mm=0.04.

[Amount of Strain Under 2.7 MPa]

In a stress-strain curve drawn in the same manner as the calculation of the compressive elastic modulus, a value from which the amount of strain of the specimen when the stress reached 2.7 MPa was read was evaluated.

[Air Permeability Change Rate after Compression]

Twenty separators cut into a size of 50 mm×60 mm were laminated and pressurized by a press at room temperature under a pressure of 5.8 to 28.9 MPa for one minute. The sample after the pressurization was taken out, and the air permeability thereof was evaluated.

The air permeability change rate after the pressurization was obtained by the following expression from the air permeability (G0) of the separator before the pressurization and the air permeability (G1) of the separator after the pressurization.

$$\text{Rate of Change in Air Permeability after Compression} = \frac{G1 - G0}{G0} \times 100$$

[Surface Roughness]

Regarding the surface roughness of the polyolefin micro porous film, an image in a range of MD 1270 μm×TD 960 μm was taken under the condition at an objective length magnification of 5 times using a white-light interferometer (Vertscan 3.0) manufactured by Ryoka Systems Inc. Line analysis was performed on arbitrary two points in the MD direction of the taken image, and the surface roughness (Ra) thereof was measured. Similar measurements were performed on the front and rear of the micro porous film, and the average value thereof was evaluated as Ra (ave). In addition, by setting one surface of the polyolefin micro porous film to the front surface and setting the other surface to the rear surface, this measurement was performed.

[Maximal Pore Diameter]

Regarding the maximal pore diameter of the polyolefin micro porous film, the maximal pore diameter was calculated from the measurement results obtained using an automated pore distribution measuring apparatus (PoreMaster 60-GT type) manufactured by Quantachrome Instruments for a pore diameter range of 0.0065 μm to 10 μm at a sample weight of about 0.15 g, and was used for evaluation.

Example 1

Hereinafter, an example of a method of producing the polyolefin micro porous film of this example will be described. However, the production method is not limited to the following, and another method may also be used. For example, in addition to the following method, the polyolefin micro porous film may also be produced by a coextrusion process using a T-die and a stretching process.

[Production of PP Web]

Using a T-die having a discharge width of 1000 mm and a discharge lip opening of 2 mm, a polypropylene resin having a weight average molecular weight of 470,000, a molecular weight distribution of 6.7, a pentad fraction of 94%, and a melting point of 161° C. was melted and extruded at a T-die temperature of 200° C. The discharged film was guided to a cooling roll at 90° C. to be cooled by cold air at 37.2° C. and was then taken up at 40 m/min. The obtained unstretched polypropylene film had a film thickness of 8.1 μm, a birefringence of 16.1×10$^{-3}$, an elastic recovery ratio of 88% after a heat treatment at 150° C. for 30 minutes. The coefficient of variation (C.V.) for the thickness of the web of the obtained web film was 0.015.

[Production of PE Web]

Using a T-die having a discharge width of 1000 mm and a discharge lip opening of 2 mm, high-density polyethylene having a weight average molecular weight of 320,000, a molecular weight distribution of 7.8, a density of 0.961 g/cm$^3$, a melting point of 133° C., and a melt index of 0.31 was melted and extruded at 173° C. The discharged film was guided to a cooling roll at 115° C. to be cooled by cold air at 39° C. and was then taken up at 20 m/min. The obtained unstretched polyethylene film had a film thickness of 9.4 μm, a birefringence of 36.7×10$^{-3}$, an elastic recovery ratio of 39% at 50% elongation. The coefficient of variation (C.V.) for the thickness of the web of the obtained web film was 0.016.

[Lamination Process]

Using the unstretched PP web and the unstretched PE web, a three-layer laminated film having a sandwich configuration with PE as the inner layer and PP as both outer layers was produced in the following manner.

From three sets of web roll sandwiches, the unstretched PP web and the unstretched PE web were unwound at a speed of 6.5 m/min, were guided to a heating roll, and were subjected to thermal compression bonding by a roll at a roll temperature of 147° C. Thereafter, the resultant were guided to a cooling roll at 30° C. at the same speed and then wound up. The unwinding tension was 5.0 kg for the PP web and was 3.0 kg for the PE web. The obtained laminated film had a film thickness of 24.0 μm and a peel strength of 67.4 g/15 mm.

[Stretching Process]

The three-layer laminated film was guided to the hot air convection oven (heat treatment zone: oven 1) heated to 125° C. and was subjected to a heat treatment. The heat-treated laminated film was then stretched at a low temperature by 18% (initial stretching ratio) between nip rolls maintained at 35° C. in a cold stretching zone. The roll speed on the supply side was 2.8 m/min. Subsequently, hot stretching was performed thereon between rollers in the hot stretching zone (oven 2) heated to 130° C. using the difference between the roll circumferential speeds until 190% (maximum stretching ratio) was achieved. Thereafter, the resultant was subsequently subjected to thermal relaxation to 125% (final stretching ratio) and was then subjected to heat fixing at 133° C. in the heat fixing zone (oven 3) to continuously obtain a polyolefin micro porous film.

Regarding the obtained polyolefin micro porous film, the measurement results of the compressive elastic modulus, the amount of strain at the time of pressurization at 2.7 MPa, the film thickness, the Gurley value, the tensile strength, the tensile elongation, the heating shrinkage ratio, the porosity (weight method), the puncture strength, the basis weight, the surface roughness, the shutdown temperature, the meltdown temperature, and the maximal pore diameter are shown in Table 1. There was no curl in the polyolefin micro porous film, and no pinhole was observed.

Comparative Example 1

A micro porous film of a single polyethylene layer was produced by a wet method using a known method. The film thickness of the obtained micro porous film was 19.7 μm. The measurement results of values of physical properties are shown in Table 1.

Example 2

[Production of Lithium-Ion Secondary Battery]

94 mass % of $LiNi_{1/3}Mn_{1/3}Co_{1/3}O_2$ and 3 mass % of acetylene black (conducting agent) were mixed. The mixture was added to a solution prepared by dissolving 3 mass % of polyvinylidene fluoride (binder) prepared in advance in 1-methyl-2-pyrrolidone and mixed to prepare a positive electrode mixture paste.

The positive electrode mixture paste was applied to one surface of an aluminum foil (current collector), was dried and pressurized, and was cut into a predetermined size to prepare a band-like positive electrode sheet. The density of the portion of the positive electrode excluding the current collector was 3.6 g/cm$^3$.

95 mass % of artificial graphite ($d_{002}$=0.335 nm, negative electrode active material) was added to a solution prepared by dissolving 5 mass % of polyvinylidene fluoride (binder) prepared in advance in 1-methyl-2-pyrrolidone and mixed to prepare a negative electrode mixture paste.

The negative electrode mixture paste was applied to one surface of a copper foil (current collector), was dried and pressurized, and was cut into a predetermined size to prepare a negative electrode sheet. The density of the portion of the negative electrode excluding the current collector was 1.5 g/cm$^3$.

The positive electrode sheet, the polyolefin micro porous film of Example 1, and the negative electrode sheet were laminated in this order, and a nonaqueous electrolytic solution was added thereto to produce a laminated battery.

As the nonaqueous electrolytic solution, an electrolytic solution having a mixing ratio of 1.2 M of $LiPF_6$ and EC/MEC/DMC=3/3/4 was used.

[DC-R Test]

Using the prepared laminated battery (battery capacity: 50 mAh), 500 mA discharging was performed for ten seconds from a SOC (State of Charge) 50% state under the temperature condition of 0° C., and the battery internal resistance was calculated by the Ohm's law (R=ΔV/0.5) from the amount of voltage drop. Furthermore, DC-R measurement was performed on the laminated cell while applying a pressure of 2.7 MPa thereto, and the increase rate of the internal resistance at the time of non-pressurization and at the time of pressurization was calculated.

Comparative Example 2

In Example 2, a change in the battery internal resistance was monitored by applying pressures of different strengths to the dry polyolefin micro porous film having the three-layer structure of PP/PE/PP. In Comparative Example 2, a DC-R test was performed using the polyolefin micro porous film (Comparative Example 1) having a single-layer structure made of PE prepared according to the wet method. A change in the battery internal resistance was monitored in the same manner as in Example 2 except that the wet PE single-layer polyolefin micro porous film was used as a polyolefin micro porous film. The results are shown in Table 6.

Example 3

Production was performed in the same manner as in Example 1 except that the film thickness of a PP web was 6.2 μm and the film thickness of a PE web was 8.0 μm. The C.V. of the obtained PP web was 0.020, and the C.V. of the obtained PE web was 0.018. The film thickness of the micro porous film prepared using the webs was 16.3 μm. The values of the other physical properties are shown in Table 1.

Example 4

Production was performed in the same manner as in Example 1 except that the film thickness of a PP web was 10.8 μm and the film thickness of a PE web was 9.4 μm. The C.V. of the obtained PP web was 0.012, and the C.V. of the obtained PE web was 0.016. The film thickness of the micro porous film prepared using the webs was 25.0 μm. The values of the other physical properties are shown in Table 1.

Example 5

Production was performed in the same manner as in Example 1 except that the film thickness of a PP web was 14.4 μm and the film thickness of a PE web was 7.6 μm. The C.V. of the obtained PP web was 0.009, and the C.V. of the obtained PE web was 0.022. The film thickness of the micro porous film prepared using the webs was 30.1 μm. The values of the other physical properties are shown in Table 1.

Example 6

A porous film was produced by setting the film thickness of a PP web to 40.0 μm and stretching the single film of the PP layer in the same manner as in the stretching process of Example 1. The C.V. of the obtained PP web was 0.010. The film thickness of the micro porous film prepared using the web was 32.2 μm. The values of the other physical properties are shown in Table 1.

Comparative Example 3

A separator with a polyethylene single layer was prepared by a wet method using a known method. The film thickness thereof was 18.2 μm. The measurement results of the values of physical properties are shown in Table 1.

Comparative Example 4

A separator with a polyethylene single layer was prepared by a wet method using a known method. The film thickness thereof was 26.0 μm. The measurement results of the values of physical properties are shown in Table 1.

TABLE 1

|  |  | Example 1 | Comparative Example 1 | Example 3 | Example 4 | Example 5 | Comparative Example 3 | Comparative Example 4 | Example 6 |
|---|---|---|---|---|---|---|---|---|---|
| Compressive elastic modulus | MPa | 124.6 | 66.1 | 118.7 | 125.6 | 126.4 | 71.6 | 31.4 | 142.2 |
| Amount of strain at time of 2.7 MPa pressurization |  | 0.037 | 0.066 | 0.036 | 0.033 | 0.035 | 0.087 | 0.138 | 0.030 |
| Film thickness | μm | 20.3 | 19.7 | 16.3 | 25.0 | 30.1 | 18.2 | 26.0 | 32.2 |
| Air permeability | sec./100 cc | 371 | 262 | 256 | 504 | 298 | 265 | 98 | 399 |
| Tensile strength | MD kg/mm² | 17.5 | 15.4 | 17 | 17.5 | 15.9 | 11.8 | 76 | 13.7 |
|  | TD kg/mm² | 1.04 | 13.9 | 1.04 | 1.02 | 1 | 11.9 | 23 | 1.5 |
| Tensile elongation | MD % | 91 | 112 | 100 | 97 | 102 | 114 | 78 | 220 |
|  | TD % | 110 or more | 110 or more | 110 or more | 110 or more | 110 or more | 110 or more | 110 or more | 110 or more |
| Heating shrinkage ratio | MD % | 3.5 | 4.2 | 4.4 | 3.9 | 4.1 | 3.1 | 3.9 | 2.2 |
|  | TD % | −0.1 | 2.0 | −0.2 | −0.2 | −0.2 | 2.1 | 8.3 | 0.0 |
| Porosity | % | 44 | 45 | 45 | 42 | 49 | 38 | 49 | 43 |
| Puncture strength | gf | 338 | 622 | 217 | 351 | 532 | 454 | 400 | 497 |
| Basis weight | g/m² | 10.7 | 10.5 | 8.4 | 13.4 | 14.2 | 11.2 | 12.7 | 16.8 |
| Surface roughness Ra(ave) | μm | 0.129 | 0.496 | 0.146 | 0.068 | 0.094 | 0.528 | 0.367 | 0.104 |
| Shutdown temperature | °C. | 132 | 135 | 133 | 132 | 132 | 135 | 136 | 173 |
| Meltdown temperature | °C. | 188 | 170 | 190 | 189 | 190 | 170 | 170 | 190 |
| Maximal pore diameter | μm | 0.12 | 0.06 | 0.11 | 0.11 | 0.12 | 0.05 | 0.26 | 0.08 |

Example 7

A web in which PP/PE/PP were in a laminated state was produced by a method of superimposing three layers of PP/PE/PP in a melted state in a T-die and simultaneously extruding the layers from the base. The thickness of the web was 14.8 μm, and the C.V. of the laminated web was 0.015. A micro porous film having a thickness of 12.5 μm was produced by processing the laminated web in the same stretching process as in Example 1. The physical properties of the produced micro porous film are shown in Table 2.

Example 8

A micro porous film having a three-layer structure of PP/PE/PP was produced in the same manner as in Example 7 except that the film thickness of a web was 19.2 μm. The film thickness of the micro porous film was 16.3 μm. The measurement results of the values of physical properties are shown in Table 2.

Example 9

A micro porous film having a thickness of 24.9 μm was produced by coating the micro porous film of Example 1 with a heat-resistant coating layer of substantially 5 μm and drying the resultant. The physical properties of the produced micro porous film are shown in Table 2. A slurry was prepared using boehmite as a filler to form a heat-resistant porous layer.

Example 10

A polyolefin micro porous film was obtained in the same manner as in Example 1 except that aluminosilicate (average particle diameter 2 μm) as inorganic insulator particles was added to the PP resin at the time of producing the PP web of Example 3 to achieve a weight of 4000 ppm and the resultant was mixed.

Example 11

A polyolefin micro porous film was obtained in the same manner as in Example 1 except that aluminosilicate (average particle diameter 2 μm) as inorganic insulator particles was added to the PP resin at the time of producing the PP web of Example 1 to achieve a weight of 4000 ppm and the resultant was mixed.

Example 12

A polyolefin micro porous film was obtained in the same manner as in Example 1 except that aluminosilicate (average particle diameter 2 μm) as inorganic insulator particles was added to the PP resin at the time of producing the PP web of Example 4 to achieve a weight of 4000 ppm and the resultant was mixed.

Example 13

A polyolefin micro porous film was obtained in the same manner as in Example 7 except that aluminosilicate (average particle diameter 2 μm) as inorganic insulator particles was added to achieve a weight of 4000 ppm with respect to the amount of the resin of the PP layer and the resultant was mixed when a web in which PP/PE/PP were in a laminated state was produced by a method of superimposing three layers of PP/PE/PP in a melted state in a T-die and a method of simultaneously extruding the layers from the base as in Example 7.

Example 14

A polyolefin micro porous film was obtained in the same manner as in Example 8 except that aluminosilicate (average particle diameter 2 μm) as inorganic insulator particles was added to achieve a weight of 4000 ppm with respect to the amount of the resin of the PP layer and the resultant was mixed when a web in which PP/PE/PP were in a laminated state was produced by a method of superimposing three layers of PP/PE/PP in a melted state in a T-die and a method of simultaneously extruding the layers from the base as in Example 8.

TABLE 2

|  |  | Example 7 | Example 8 | Example 9 | Example 10 | Example 11 | Example 12 | Example 13 | Example 14 |
|---|---|---|---|---|---|---|---|---|---|
| Compressive elastic modulus | MPa | 110.4 | 115.5 | 106.8 | 125.2 | 125.4 | 126.0 | 112.5 | 121.5 |
| Amount of strain at time of 2.7 MPa pressurization |  | 0.041 | 0.038 | 0.047 | 0.036 | 0.039 | 0.033 | 0.042 | 0.035 |
| Film thickness | μm | 12.5 | 16.3 | 24.9 | 16.2 | 20.9 | 25.0 | 12.3 | 16.6 |
| Air permeability | sec./100 cc | 166 | 220 | 383 | 285 | 389 | 495 | 164 | 220 |
| Tensile strength MD | kg/mm² | 18.2 | 19.2 | 14.4 | 16.4 | 18.5 | 17.5 | 18.1 | 18.1 |
| TD | kg/mm² | 0.9 | 0.9 | 0.9 | 1.1 | 1.0 | 1.1 | 0.9 | 1.1 |
| Tensile elongation MD | % | 77 | 67 | 107 | 98 | 86 | 79 | 77 | 89 |
| TD | % | 110 or more | 110 or more | 110 or more | 110 | 110 | 110 | 110 | 110 |
| Heating shrinkage ratio MD | % | 6.7 | 4.6 | 0.7 | 4.1 | 5.1 | 3.5 | 6.1 | 3.9 |
| TD | % | -0.1 | -0.2 | 0.0 | -0.1 | -0.1 | -0.2 | -0.1 | -0.1 |
| Porosity | % | 48 | 50 | — | 44 | 44 | 42.9 | 49 | 47 |
| Puncture strength | gf | 210 | 356 | 357 | 268 | 310 | 376 | 209 | 305 |
| Basis weight | g/m² | 6.1 | 7.7 | 17.6 | 8.5 | 10.8 | 13.0 | 6.0 | 7.9 |
| Surface roughness Ra(ave) | μm | 0.168 | 0.163 | 0.215 | 0.133 | 0.172 | 0.155 | 0.152 | 0.162 |
| Shutdown temperature | °C. | 132 | 132 | 132 | 132 | 132 | 132 | 132 | 132 |
| Meltdown temperature | °C. | 189 | 190 | 230 or more | 189 | 190 | 190 | 189 | 190 |
| Maximal pore diameter | μm | 0.11 | 0.11 | 0.18 | 0.12 | 0.11 | 0.11 | 0.11 | 0.11 |

A predetermined pressure was applied to the polyolefin micro porous films of Examples 1 and 3 to 14 and Comparative Examples 1 and 2 to 4 obtained according to the above-described procedures, the pressure was released, and the Gurley value and the film thickness thereof were then measured. The results are shown in Tables 3 to 6. The upper side of the tables shows a collection of actual measurement values, and the lower side of the tables show a collection of film thickness decrease rates and Gurley increase rates based on the actual measurement values shown in the upper side of the tables.

TABLE 3

|  |  | Example 1 | | Comparative Example 1 | | Example 3 | | Example 4 | | Example 5 | |
|---|---|---|---|---|---|---|---|---|---|---|---|
|  | Pressure MPa | Film thickness μm | Gurley Sec/100 cc. | Film thickness μm | Gurley Sec/100 cc. | Film thickness μm | Gurley Sec/100 cc. | Film thickness μm | Gurley Sec/100 cc. | Film thickness μm | Gurley Sec/100 cc. |
| Non-pressurization | 0.0 | 20.3 | 370 | 19.7 | 262 | 16.3 | 256 | 25.0 | 504 | 30.1 | 298 |
| After pressurization | 5.8 | 20.3 | 370 | 19.3 | 268 | 16.2 | 260 | 24.9 | 504 | 30.1 | 305 |
|  | 11.5 | 20.3 | 371 | 19.0 | 328 | 16.1 | 267 | 24.8 | 517 | 29.9 | 306 |
|  | 17.3 | 20.1 | 399 | 18.1 | 406 | 15.9 | 271 | 24.3 | 536 | 29.1 | 317 |
|  | 23.1 | 19.6 | 430 | 16.8 | 561 | 15.1 | 293 | 23.8 | 577 | 27.8 | 338 |
|  | 28.9 | 18.9 | 487 | 16.2 | — | 14.7 | 487 | 23.0 | 763 | 24.8 | 517 |
|  | Pressure MPa | Film thickness decrease rate % | Gurley increase rate % | Film thickness decrease rate % | Gurley increase rate % | Film thickness decrease rate % | Gurley increase rate % | Film thickness decrease rate % | Gurley increase rate % | Film thickness decrease rate % | Gurley increase rate % |
| Non-pressurization | 0.0 | 0.0 | 0.0 | 0.0 | 0.0 | 0.0 | 0.0 | 0.0 | 0.0 | 0.0 | 0.0 |
| After pressurization | 5.8 | 0.0 | 0.0 | 2.2 | 2.1 | 0.7 | 1.7 | 0.5 | 0.0 | 0.1 | 2.6 |
|  | 11.5 | 0.0 | 0.3 | 3.6 | 25.1 | 1.5 | 4.6 | 0.9 | 2.5 | 0.8 | 2.8 |
|  | 17.3 | 0.6 | 7.8 | 8.3 | 54.9 | 2.8 | 5.9 | 2.8 | 6.4 | 3.2 | 6.3 |
|  | 23.1 | 3.2 | 16.3 | 14.7 | 114.0 | 7.1 | 14.5 | 4.9 | 14.4 | 7.5 | 13.6 |
|  | 28.9 | 6.5 | 31.6 | 17.7 | — | 9.8 | 90.4 | 8.1 | 51.3 | 17.6 | 73.7 |

TABLE 4

| | | Comparative Example 3 | | Comparative Example 4 | | Example 6 | | Example 7 | | Example 8 | | Example 9 | |
|---|---|---|---|---|---|---|---|---|---|---|---|---|---|
| | Pressure MPa | Film thickness μm | Gurley Sec/100 cc. | Film thickness μm | Gurley Sec/100 cc. | Film thickness μm | Gurley Sec/100 cc. | Film thickness μm | Gurley Sec/100 cc. | Film thickness μm | Gurley Sec/100 cc. | Film thickness μm | Gurley Sec/100 cc. |
| Non-pressurization | 0.0 | 18.2 | 265 | 26.0 | 98 | 32.2 | 399 | 12.5 | 166 | 16.3 | 220 | 24.5 | 268 |
| After pressurization | 5.8 | 17.9 | 273 | 24.9 | 130 | 32.2 | 400 | 12.5 | 168 | 16.3 | 220 | 24.4 | 268 |
| | 11.5 | 17.8 | 285 | 22.6 | 243 | 32.2 | 402 | 12.0 | 169 | 16.1 | 226 | 23.8 | 272 |
| | 17.3 | 17.2 | 345 | 20.8 | 483 | 32.1 | 402 | 11.8 | 211 | 15.8 | 245 | 23.5 | 304 |
| | 23.1 | 16.4 | 438 | 19.8 | 718 | 32.1 | 403 | 11.2 | 229 | 14.7 | 343 | 22.2 | 367 |
| | 28.9 | 16.6 | — | 19.3 | — | 31.6 | 410 | — | — | — | — | 21.4 | 424 |
| | Pressure MPa | Film thickness decrease rate % | Gurley increase rate % | Film thickness decrease rate % | Gurley increase rate % | Film thickness decrease rate % | Gurley increase rate % | Film thickness decrease rate % | Gurley increase rate % | Film thickness decrease rate % | Gurley increase rate % | Film thickness decrease rate % | Gurley increase rate % |
| Non-pressurization | 0.0 | 0.0 | 0.0 | 0.0 | 0.0 | 0.0 | 0.0 | 0.0 | 0.0 | 0.0 | 0.0 | 0.0 | 0.0 |
| After pressurization | 5.8 | 1.5 | 3.0 | 4.4 | 32.9 | 0.0 | 0.3 | 0.0 | 1.2 | 0.0 | 0.0 | 0.0 | 0.0 |
| | 11.5 | 2.0 | 7.5 | 13.0 | 148.0 | 0.1 | 0.7 | 4.1 | 1.9 | 1.1 | 2.6 | 2.9 | 1.6 |
| | 17.3 | 5.5 | 30.0 | 20.1 | 392.4 | 0.4 | 0.8 | 5.2 | 27.2 | 3.2 | 11.3 | 4.2 | 13.5 |
| | 23.1 | 9.7 | 65.2 | 23.8 | 632.7 | 0.3 | 1.1 | 10.8 | 37.8 | 10.1 | 55.8 | 9.4 | 36.9 |
| | 28.9 | 8.8 | — | 25.7 | — | 1.8 | 2.9 | — | — | — | — | 12.7 | 58.3 |

TABLE 5

| | | Example 10 | | Example 11 | | Example 12 | | Example 13 | | Example 14 | |
|---|---|---|---|---|---|---|---|---|---|---|---|
| | Pressure MPa | Film thickness μm | Gurley Sec/100 cc. | Film thickness μm | Gurley Sec/100 cc. | Film thickness μm | Gurley Sec/100 cc. | Film thickness μm | Gurley Sec/100 cc. | Film thickness μm | Gurley Sec/100 cc. |
| Non-pressurization | 0.0 | 16.2 | 257 | 20.9 | 371 | 25.0 | 500 | 12.3 | 352 | 16.6 | 196 |
| After Pressurization | 5.8 | 16.2 | 258 | 20.9 | 372 | 24.6 | 505 | 12.3 | 154 | 16.2 | 196 |
| | 11.5 | 15.9 | 268 | 20.7 | 373 | 24.5 | 517 | 12.0 | 158 | 15.7 | 201 |
| | 17.3 | 16.2 | 274 | 20.0 | 400 | 24.1 | 535 | 31.3 | 175 | 15.7 | 219 |
| | 23.1 | 15.0 | 292 | 19.2 | 429 | 22.9 | 577 | 11.0 | 197 | 14.5 | 328 |
| | 28.9 | 14.5 | 496 | 18.8 | 491 | 22.2 | 798 | — | — | — | — |
| | Pressure MPa | Film thickness decrease rate % | Gurley increase rate % | Film thickness decrease rate % | Gurley increase rate % | Film thickness decrease rate % | Gurley increase rate % | Film thickness decrease rate % | Gurley increase rate % | Film thickness decrease rate % | Gurley increase rate % |
| Non-pressurization | 0.0 | 0.0 | 0.0 | 0.0 | 0.0 | 0.0 | 0.0 | 0.0 | 0.0 | 0.0 | 0.0 |
| After Pressurization | 5.8 | 0.2 | 0.0 | 0.0 | 0.5 | 1.4 | 1.0 | 0.0 | 1.8 | 0.0 | 0.0 |
| | 11.5 | 3.8 | 4.1 | 1.0 | 0.5 | 2.0 | 3.5 | 2.5 | 4.1 | 5.1 | 2.7 |
| | 17.3 | 0.2 | 6.4 | 4.4 | 7.8 | 3.8 | 7.0 | 7.6 | 15.4 | 5.1 | 11.8 |
| | 23.1 | 7.3 | 13.5 | 8.2 | 15.7 | 8.3 | 15.4 | 10.0 | 30.0 | 12.4 | 67.3 |
| | 28.9 | 10.9 | 93.0 | 10.2 | 32.6 | 11.1 | 59.6 | — | — | — | — |

The stress-strain curves of Example 1 and Comparative Example 1 are shown in FIG. 1. The compressive elastic modulus was calculated from the slope of the stress-strain curve, and the amount of strain at a stress value of 2.7 MPa was read.

Figure 2:
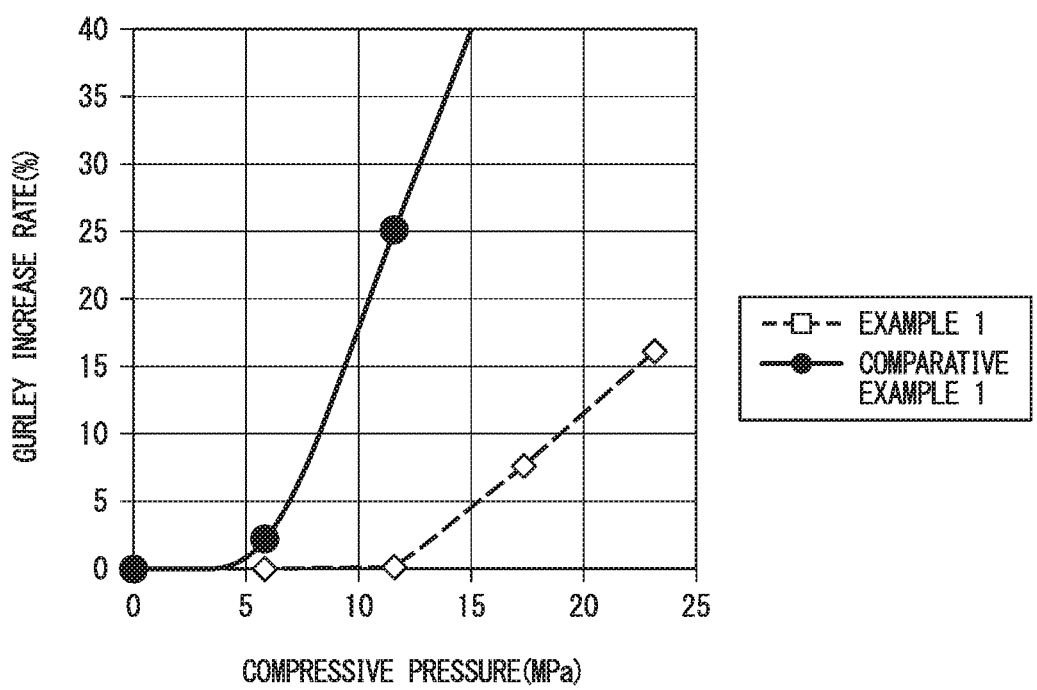
FIG. 2 shows a pressure applied to micro porous films in Example 1 and Comparative Example 1 and the rate of change in Gurley values.

The pressure applied to the micro porous film of Example 1 and Comparative Example 1 and the rate of change in the Gurley values are shown in FIG. 2.

TABLE 6

|  |  | Example 2 | Comparative Example 2 |
|---|---|---|---|
|  |  | DC-R(Ω) | |
| Pressure MPa | 0.0 | 1.74 | 1.80 |
|  | 2.7 | 1.80 | 1.92 |
|  |  | Rate of change in resistance | |
| Pressure MPa | 0.0 | 0 | 0 |
|  | 2.7 | 3.4 | 6.7 |

When Examples 1 and 3 to 14 and Comparative Examples 1, 3, and 4 are compared, in the polyolefin micro porous film of Example 1, the increase rate of the Gurley value obtained when a pressure of 17.3 MPa was applied was 0.5% or more and 29.0% or less. Particularly, in a case where a pressure of 11.5 MPa was applied, the increase rate of the Gurley value was 0.05% or more and 6.0% or less. Furthermore, in a case where a pressure of 5.8 MPa was applied, the increase rate of the Gurley value was 0.0% or more and 2.9% or less.

In a range of 11.5 MPa or more and 23.1 MPa or less, the increase rate of Gurley according to the applied pressure was 1.4% MPa or less. In a range of 11.5 MPa or more and 17.3 MPa or less, the increase rate of Gurley according to the applied pressure was approximately 0.01 to 1.70%/MPa, and was 0.01 to 0.60%/MPa in Examples 3 to 6.

Contrary to this, in the wet polyolefin micro porous films described in Comparative Examples 3 and 4, even in a case where a pressure of 5.8 MPa was applied, the Gurley value had significantly increased.

In addition, as shown in Examples 10 to 14, even in a case where the inorganic insulator particles functioning as a lubricant were added, the Gurley value did not increase sharply.

Therefore, in a case where a nonaqueous electrolytic solution battery is assembled using the polyolefin micro porous film according to the aspect of the present invention, for example, even when a relatively high pressure, for example, 17.3 MPa is applied to the battery, the Gurley value hardly changes, and the influence on the battery characteristics can be reduced.

On the other hand, in a case where a nonaqueous electrolytic solution battery is assembled using the polyolefin micro porous film described in the comparative examples, the Gurley value significantly changes immediately after a pressure is applied to the battery, and thus the battery characteristics are relatively significantly affected.

As shown in Table 6, in a laminated battery assembled by using the polyolefin micro porous film according to the aspect of the present invention, the change in the battery internal resistance after the laminated battery was compressed was relatively small even.

On the other hand, in a laminated battery assembled by using the wet polyolefin micro porous film, the change in the battery internal resistance after the laminated battery was compressed was large.

From the above description, in a case where a power-storage device such as a lithium-ion secondary battery is assembled by using the polyolefin micro porous film of the present invention, the Gurley value is less likely to change even in a case where the power-storage device is compressed. Therefore, a power-storage device in which the battery characteristics, for example, the battery internal resistance are less likely to change even during pressurization can be provided.

INDUSTRIAL APPLICABILITY

When the polyolefin micro porous film according to the aspect of the present invention is used, a power-storage device which exhibits excellent resistance against a restraint member that suppresses expansion and contraction from the outside or in a process of compressing the device can be obtained. In particular, by using the power-storage device as a power-storage device for a lithium-ion secondary battery or the like mounted in a hybrid electric vehicle, a plug-in hybrid electric vehicle, and a battery electric vehicle, the reliability of the vehicles can be increased.

What is claimed is:

1. A polyolefin micro porous film having:
   a compressive elastic modulus of 105 MPa to 145 MPa,
   an average value (Ra(ave)) of a surface roughness (Ra) of a film surface measured at a front surface and a rear surface of 0.05-0.23 µm,
   a maximal micropore diameter obtained by using a mercury porosimeter is in a range of 0.08 to 0.18 µm, and
   a porosity of 35% to 60%,
   wherein the polyolefin micro porous film comprises a layer of polyethylene having two surfaces, and a polypropylene layer laminated to each of the two surfaces of the polyethylene layer,
   an amount of strain in a compression direction is in a range of 0.010 to 0.037 when a strain pressure of 2.7 MPa is applied,
   after a pressure of 17.3 MPa is applied thereto, a Gurley value obtained when the pressure is released is higher than a Gurley value obtained before the pressure is applied thereto, and its increase rate of the Gurley value is 0.5% or more and 29.0% or less,
   after a pressure of 11.5 MPa is applied thereto, a Gurley value obtained when the pressure is released is higher than a Gurley value obtained before the pressure is applied thereto, and its increase rate of the Gurley value is 0.05% or more and 6.0% or less,
   a thermal shrinkage ratio in a TD direction is in a range of −1.0% to 1.0%, and a thermal shrinkage ratio in an MD direction is in a range of 0.5% to 8.0%,
   a Gurley value is in a range of 100 to 600 sec/100 cc, a film thickness is in a range of 10 to 40 µm, a puncture strength is in a range of 200 to 700 gf.

2. The polyolefin micro porous film according to claim 1, wherein a shutdown temperature in a range of 130° C. to 140° C., and a meltdown temperature is 175° C. or higher and 190° C. or lower.

3. The polyolefin micro porous film according to claim 1, wherein a heat-resistant porous layer primarily containing heat-resistant fine particles and containing a resin binder is provided on the polyolefin micro porous film.

4. A separator film for a power-storage device using the polyolefin micro porous film according to claim 1.

5. A power-storage device comprising:
a positive electrode;
a negative electrode;
the polyolefin micro porous film according to claim 1 interposed between the positive electrode and the negative electrode; and
a nonaqueous electrolyte with which the polyolefin micro porous film is impregnated,
wherein a resistance value obtained by DC-R measurement upon application of a pressure of 2.7 MPa is in a range of 100.1% to 105.0%, wherein 100% is a resistance value when no pressure is applied.

6. The polyolefin micro porous film according to claim 1, wherein an interlaminar peel strength is in a range of 3 g to 80 g/15 mm.

7. The polyolefin micro porous film according to claim 1, wherein the porosity is 42% to 50%.

* * * * *